US011746065B2

United States Patent
Eberling-Fux et al.

(10) Patent No.: US 11,746,065 B2
(45) Date of Patent: Sep. 5, 2023

(54) METHOD FOR MANUFACTURING A PART MADE OF COMPOSITE MATERIAL USING AN ADHESION PROMOTER COMPRISING A LEWIS ACID OR A LEWIS COMPLEX

(71) Applicants: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR); UNIVERSITE DE MONTPELLIER, Montpellier (FR); ECOLE NATIONALE SUPERIEURE DE CHIMIE DE MONTPELLIER, Montpellier (FR)

(72) Inventors: Nicolas Eberling-Fux, Moissy-Cramayel (FR); Marion France Hélène Schmidt, Moissy-Cramayel (FR); Samuel Jean-Charles Bernard, Saint-Just-le-Martel (FR)

(73) Assignees: CENTRE NATIONAL DE LA RECHERCHE SCIENTIFIQUE, Paris (FR); SAFRAN CERAMICS, Le Haillan (FR); UNIVERSITE DE BORDEAUX, Bordeaux (FR); UNIVERSITE DE MONTPELLIER, Montpellier (FR); ECOLE NATIONALE SUPERIEURE DE CHIMIE DE MONTPELLIER, Montpellier (FR)

( * ) Notice: Subject to any disclaimer, the term of this patent is extended or adjusted under 35 U.S.C. 154(b) by 0 days.

(21) Appl. No.: 18/007,572

(22) PCT Filed: Jun. 2, 2021

(86) PCT No.: PCT/FR2021/050998
§ 371 (c)(1),
(2) Date: Dec. 1, 2022

(87) PCT Pub. No.: WO2021/250341
PCT Pub. Date: Dec. 16, 2021

(65) Prior Publication Data
US 2023/0192567 A1 Jun. 22, 2023

(30) Foreign Application Priority Data

Jun. 9, 2020 (FR) .................................. 2005989

(51) Int. Cl.
*C04B 41/45* (2006.01)

(52) U.S. Cl.
CPC ...... *C04B 41/4554* (2013.01); *C04B 41/4552* (2013.01); *C04B 2235/483* (2013.01); *C04B 2235/616* (2013.01); *C04B 2235/65* (2013.01)

(58) Field of Classification Search
CPC .......... C04B 35/6269; C04B 35/62844; C04B 41/4552
See application file for complete search history.

(56) References Cited

U.S. PATENT DOCUMENTS

| 5,707,471 A * | 1/1998 | Petrak ............... C04B 35/62868 156/89.27 |
| 2017/0130014 A1* | 5/2017 | Anyaogu ................. F16G 5/08 |
| 2020/0131090 A1* | 4/2020 | Eberling-Fux .... C04B 35/62884 |

FOREIGN PATENT DOCUMENTS

| WO | WO 2006/136755 A2 | 12/2006 |
| WO | WO 2018/229428 A1 | 12/2018 |

OTHER PUBLICATIONS

Written Opinion of the International Searching Authority as issued in International Patent Application No. PCT/FR2021/050998, dated Sep. 8, 2021.

(Continued)

*Primary Examiner* — Robert A Vetere
(74) *Attorney, Agent, or Firm* — Pillsbury Winthrop Shaw Pittman LLP (57) ABSTRACT

A method for manufacturing a part made of composite material in which an adhesion promoter is grafted to a coating present on the fibre surface as well as to a ceramic precursor resin. Afterwards, a ceramic matrix phase is formed in the porosity of the fibre preform by pyrolysis of the polymerised resin.

9 Claims, 4 Drawing Sheets

(56) References Cited

OTHER PUBLICATIONS

International Search Report as issued in International Patent Application No. PCT/FR2021/050998, dated Sep. 8, 2021.

* cited by examiner

METHOD FOR MANUFACTURING A PART MADE OF COMPOSITE MATERIAL USING AN ADHESION PROMOTER COMPRISING A LEWIS ACID OR A LEWIS COMPLEX

CROSS-REFERENCE TO RELATED APPLICATIONS

This application is the U.S. National Stage of PCT/FR2021/050998, filed Jun. 2, 2021, which in turn claims priority to French patent application number 2005989 filed Jun. 9, 2020. The content of these applications are incorporated herein by reference in their entireties.

TECHNICAL FIELD

The present invention relates to a method for manufacturing a part made of composite material with an at least partially ceramic matrix having improved mechanical properties.

PRIOR ART

Parts made of composite material with an at least partially ceramic matrix can conventionally be obtained by a polymer impregnation and pyrolysis (PIP) technique. According to such a technique, a liquid composition comprising a ceramic precursor polymer is introduced into the pores of a fibrous preform. The composition thus introduced is next polymerised then pyrolysed in order to form the ceramic matrix phase. Various types of ceramic matrices can be formed by this method, depending on the choice of the precursor used. In particular, it is possible to use a polysilazane polymer in order to obtain a SiCN matrix, a polycarbosilane polymer in order to obtain a SiC matrix, or a polysiloxane polymer in order to obtain a SiCO matrix.

It is usual to repeat these infiltration and pyrolysis cycles several times in a row, in order to obtain the desired level of porosity for the densified part, since the transformation into ceramic by pyrolysis involves a volume shrinkage.

One of the limitations in the mechanical properties of parts having a matrix obtained by a PIP technique results from an adhesion problem at the interfaces of the PIP matrix.

Furthermore, application WO 2018/229428 is known, which discloses the use of silane adhesion promoters in order to improve the adhesion between the fibrous reinforcement and the ceramic matrix.

It is desirable to have new solutions for improving the mechanical properties exhibited by parts made of composite material, the matrix of which has been at least partially formed by a PIP technique. It is also desirable to improve the thermal resistance of matrices formed by the PIP technique, in particular at temperatures of order 1500° C.

DISCLOSURE OF THE INVENTION

The invention relates, according to a first aspect, to a method for manufacturing a part made of composite material, comprising at least the following steps:

a) introducing an adhesion promoter into the pores of a fibrous preform formed by yarns coated by a coating having —OH groups at its surface, the adhesion promoter being a Lewis complex or a Lewis acid, the Lewis complex adhesion promoter comprising a reactive structure S1 of formula B1-X—H, where B1 is a Lewis base, the Lewis acid adhesion promoter comprising a reactive structure S2 of formula X—H with the atom X having an empty orbital, in these two alternatives, X designates boron or aluminium, b) grafting the adhesion promoter to the surface of the coating by addition on the —OH groups at the atom X, c) introducing a ceramic precursor resin into the pores of the fibrous preform, after the step of grafting the adhesion promoter, d) polymerising the introduced resin and bonding the grafted adhesion promoter to the resin by chemical reaction between these two compounds at the X—H bond of the grafted promoter, this polymerisation and this bonding being carried out by heating the fibrous preform into which the resin has been introduced, and e) forming a ceramic matrix phase in the pores of the fibrous preform by pyrolysis of the polymerised resin.

Figure 1:
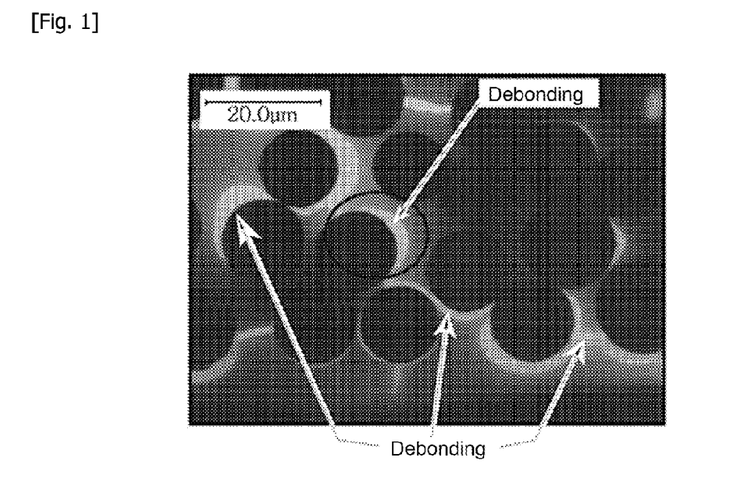
FIG. 1 is a photograph showing the existence of debonding between a ceramic precursor in the polymerised state and a PyC coating formed on yarns (not forming part of the invention).
Figure 2:
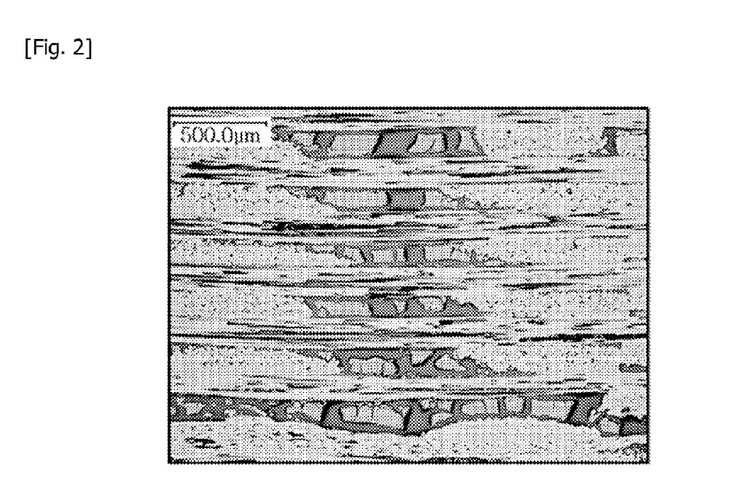
FIG. 2 is a photographs showing the existence of debonding between a PIP matrix phase and a SiC coating formed on yarns (not forming part of the invention).

One of the limitations in the mechanical properties of parts having a matrix obtained by a PIP technique results from an adhesion problem at the interfaces of the PIP matrix. Indeed, the inventors have observed debonding between the ceramic precursor in the polymerised state and a coating formed beforehand on the yarns (see FIG. 1). In the test associated with FIG. 1, the coating was an interphase layer of pyrolytic carbon (PyC) covering the yarns. FIG. 2 in turn demonstrates the existence of debonding between the matrix phase obtained after pyrolysis of the precursor and a coating of silicon carbide (SiC) formed beforehand on the yarns. The existence of this debonding results in suboptimal mechanical properties for the parts obtained, due to a limitation in the transfer of charges between the matrix and the fibrous reinforcement. The present invention has been developed in order to solve this problem and uses an adhesion promoter that can improve the adhesion between the PIP matrix phase and a coating formed beforehand on the yarns. This previously-formed coating can be of various types, as will be described below.

When the adhesion promoter is a Lewis acid, it includes an empty orbital at the atom X which is intended to be filled by the electrons from the oxygen of the dangling —OH groups present at the surface of the underlying coating. A covalent bond is thus formed between the oxygen atom of the —OH groups and the atom X during the grafting. It should be noted that the —OH groups are naturally present after exposing the coating to ambient air. Once the grafting has been performed, the X—H bonds of the promoter are able to react chemically with the resin. This reaction can covalently bond the promoter to the ceramic precursor resin.

When the adhesion promoter is a Lewis complex, the Lewis base B1 constitutes a group that departs during the grafting. A covalent bond is thus formed between the oxygen atom of the —OH groups and the atom X. The X—H bonds of the promoter are then able to chemically react with the resin as in the case of the Lewis acid.

The adhesion promoter thus constitutes a bonding intermediary between the resin, in other words ultimately the PIP matrix, and the underlying coating, thus improving the adhesion of this matrix phase to this coating. The use of the adhesion promoter proposed by the present invention thus contributes to improving the mechanical properties of the composite material part obtained. In addition, the reaction of the adhesion promoter with the ceramic precursor resin increases its degree of cross-linking and its density, thus increasing the mass yield of this resin and reducing its volume shrinkage.

In an exemplary embodiment, X is boron.

Such a feature is advantageous because it makes it possible to obtain boron in the ceramic matrix phase after pyrolysis, thus improving the thermal resistance of the matrix. In particular, it is possible to obtain a ceramic matrix that is heat-stable at 1500° C., of the SiBCN type for example.

Alternatively, X can be aluminium.

Such a feature is advantageous in order to improve the oxidation resistance of the matrix formed.

In an exemplary embodiment, the adhesion promoter is a Lewis complex of general formula B1-BH$_3$ or B1-AlH$_3$. B1 can be, for example, an aliphatic or aromatic hydrocarbon chain having 1 to 12 carbon atoms, for example 1 to 4 carbon atoms. B1 can be a linear or branched hydrocarbon chain having 1 to 12 carbon atoms, for example 1 to 4 carbon atoms. The adhesion promoter can be a Lewis complex and the Lewis base B1 can have formula *—S—R$_2$ or *—N—R$_3$, with *- designating the bond to the atom X and in each of these formulas the R groups being identical or different and being a saturated or unsaturated hydrocarbon chain having 1 to 12 carbon atoms, for example 1 to 4 carbon atoms.

The R groups can be chosen, in particular, from: a methyl group or an ethyl group.

The adhesion promoter can be, in particular, borane dimethylsulfide having the formula below:

[Chem. 1]

The adhesion promoter can be, in particular, Alane N—N dimethylamine having the formula below:

[Chem. 2]

Alternatively, the adhesion promoter is a Lewis acid of general formula R'$_2$—BH or R'$_2$—AlH, in each of these formulas the R' groups being identical or different and being a hydrogen atom, a saturated or unsaturated hydrocarbon chain containing 1 to 12 carbon atoms, for example 1 to 4 carbon atoms, the R' groups optionally together defining a same cyclic hydrocarbon chain. In this case, the adhesion promoter can be, in particular, 9-borabicyclo[3.3.1]nonane having the formula below:

[Chem. 3]

In an exemplary embodiment, the ceramic precursor resin comprises at least one reactive function reacting with the X—H bond of the adhesion promoter grafted during step d) and chosen from: a carbon-carbon double bond, an N—H group, an Si—H group and an —OH group.

In particular, the reactive function can be an allyl group or a vinyl group.

In an exemplary embodiment, the method further comprises, before introducing the promoter, a step of forming the coating on the yarns by chemical vapour deposition or chemical vapour infiltration (CVD or CVI).

In this case, the coating can be an interphase or a preliminary matrix phase. In this example, the use of the adhesion promoter improves the adhesion of the PIP matrix phase formed directly on this coating.

Alternatively, the method further comprises, before introducing the promoter, a step of forming the coating on the yarns by introducing a precursor compound into the pores of the preform and pyrolysis of this precursor compound.

In this case, the coating constitutes a preliminary PIP matrix phase and use of the adhesion promoter improves the adhesion between two consecutively formed PIP matrix blocks. It should be noted that when the matrix is formed from a plurality of PIP matrix blocks, it is possible to implement the above-described method in order to improve the adhesion between each of these blocks.

In an exemplary embodiment, the material forming the surface of the coating is chosen from: carbon, boron-doped carbon, silicon carbide, boron nitride, boron nitride doped with silicon or silicon nitride.

In an exemplary embodiment, the resin is chosen from: polysiloxane resins, polysilazane resins, polycarbosiloxane resins, polycarbosilane resins, polycarbosilazane resins and the mixtures of such resins.

DESCRIPTION OF THE EMBODIMENTS

First, a fibrous preform formed of refractory yarns, such as ceramic or carbon yarns, is formed.

The preform can be formed, for example, from silicon carbide yarns supplied by the Japanese company NGS under the reference "Nicalon", "Hi-Nicalon" or "Hi-Nicalon Type S". The carbon yarns that can be used to form this preform are supplied, for example, by Toray under the name Torayca T300 3K.

The fibrous preform is obtained from at least one textile operation. The fibrous preform is intended to form the fibrous reinforcement of the part to be obtained.

The fibrous preform can be obtained, in particular, by multilayer or three-dimensional weaving.

The term "three-dimensional weaving" or "3D weaving" should be understood as meaning a method of weaving by which at least some warp threads connect weft threads over a plurality of weft layers. A reversal of the roles between warp and weft is possible in the present description and should also be considered to be covered by the claims.

The fibrous preform can have, for example, a multi-satin weave, in other words it may be a fabric obtained by three-dimensional weaving with a plurality of layers of weft yarns for which the basic weave of each layer is equivalent to a conventional satin weave but with certain points of the weave which bind the layers of weft yarns together. Alternatively, the fibrous preform can have an interlock weave. The term "interlock weave or fabric", should be understood to mean three-dimensional weaving, in which each layer of warp yarns connects a plurality of layers of weft yarns, with all the yarns of the same warp column having the same movement in the weave plane. Various multilayer weaving methods which can be used to form the fibrous preform are described in document WO 2006/136755.

It is also possible to first form fibrous textures such as two-dimensional fabrics or unidirectional sheets, and to obtain the fibrous preform by draping such fibrous textures on a form. These textures can optionally be bonded together, for example by stitching or implantation of yarns in order to form the fibrous preform.

The coating is then formed on the yarns of the preform. This coating can be an interphase or include one or more matrix phases partially densifying the fibrous preform. The coating can be made of carbon, in particular of PyC, of boron-doped carbon (BC, with boron in an atomic proportion between 5% and 20%, the remainder being carbon) or made of ceramic material, such as silicon carbide, boron nitride (BN), silicon-doped boron nitride (BN(Si), with silicon in a mass proportion between 5% and 40%, the remainder being boron nitride) or silicon nitride ($Si_3N_4$). The coating can thus be formed by a single-layer or multi-layer interphase. In which case, the surface of the interphase exhibits the —OH groups intended to enable the grafting of the adhesion promoter. This interphase can include at least one layer of pyrolytic carbon, boron nitride, silicon-doped boron nitride or boron-doped carbon. Here, the interphase has a de-embrittlement function for the composite material which promotes the diversion of possible cracks arriving at the interphase after having propagated in the matrix, preventing or delaying the rupture of the yarns by such cracks.

The thickness of the interphase can be between 10 nm and 1000 nm, and for example between 10 nm and 100 nm. The interphase can be formed by CVI on the yarns of the preform.

Alternatively, it is possible to form the interphase by chemical vapour deposition on the yarns before forming the preform, then forming this preform from yarns coated in this way.

Alternatively, the coating may contain at least one preliminary matrix phase and optionally an interphase inserted between said at least one preliminary matrix phase and the yarns. In which case, the outer preliminary matrix phase, i.e. the one furthest from the yarns of the preform, has the —OH groups on its surface, intended to enable the grafting of the adhesion promoter.

The preliminary outer matrix phase can be formed by various known methods, such as CVI, silicon melt-infiltration or by a PIP technique. It should be noted therefore that, in this latter case, the adhesion promoter improves the adhesion between two consecutive PIP matrix blocks. The preliminary outer matrix phase can be ceramic or made of carbon. The preliminary outer matrix phase can be made of carbon, or even of PyC, made of silicon carbide, boron nitride or silicon nitride.

Of course, the fibrous preform remains porous after formation of the coating, in order to allow the formation of a PIP ceramic matrix phase bonded to the coating by means of the adhesion promoter. This aspect will now be described by means of a first exemplary method according to the invention, illustrated in FIGS. 3 to 6.

Figure 3:
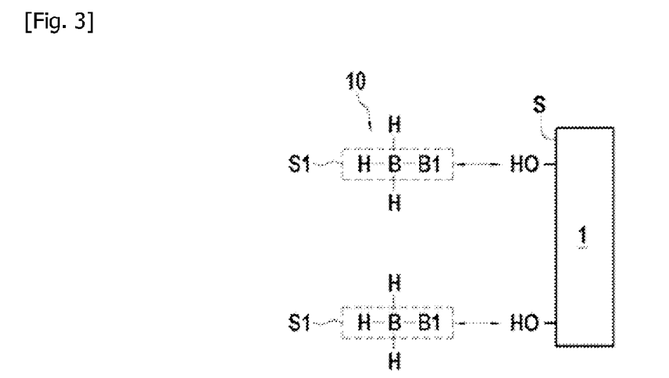
FIG. 3 schematically illustrates a step of a first exemplary method according to the invention.

After forming the coating 1 on the fibres, the adhesion promoter 10 is introduced into the residual pores of the fibrous preform (see FIG. 3). The adhesion promoter can be introduced in the liquid state into the pores of the fibrous preform. The adhesion promoter 10 can be injected into the pores of the fibrous preform. The liquid medium introduced, comprising the adhesion promoter 10, can fill all of the accessible pores of the fibrous preform. The introduced adhesion promoter 10 is in contact with the surface S of the coating 1 bearing the —OH groups. This surface S corresponds to the outer surface of the coating 1, i.e. to the surface furthest away from the yarns forming the preform. In the illustrated example, the adhesion promoter 10 is a boron-based Lewis complex of general formula $B1-BH_3$, where B1 designates a Lewis base. Other possible examples of Lewis complexes have been indicated above. For reasons of conciseness, the figures only show a boron adhesion promoter, but the same principle remains applicable when the promoter is aluminium-based.

The adhesion promoter comprises, in particular, a reactive structure S1 of formula B1-B—H. The B1-B (boron-Lewis base bond) portion is intended to react with the oxygen of the —OH groups, and the B—H (boron-hydrogen bond) portion is intended to react with the ceramic precursor resin.

A first heating can be carried out in order to graft the promoter 10 on the surface S of the coating 1. However, this heating is not compulsory; placing them in contact at ambient temperature (20° C.) or at a lower temperature may be sufficient to graft the promoter to the coating of the fibres. The temperature imposed during the grafting can be between −50° C. and +60° C., for example between −20° C. and +30° C. The promoter 10 and the —OH groups are placed in contact for a duration sufficient to perform the grafting. This duration depends on the chemical nature of the chosen promoter. By way of example, the promoter 10 and the —OH groups can be placed in contact for a duration greater than or equal to 2 hours, for example greater than or equal to 3 hours, in order to perform the grafting. The introduction of the adhesion promoter 10 and the grafting can be carried out in an inert atmosphere or under vacuum. During this grafting, boron is added on the oxygen of the —OH groups and the Lewis base B1 departs. The grafted promoter 20 is bonded to the surface S of the coating 1 by a covalent bond between the oxygen of the —OH groups and the boron (see FIG. 4).

Figure 4:
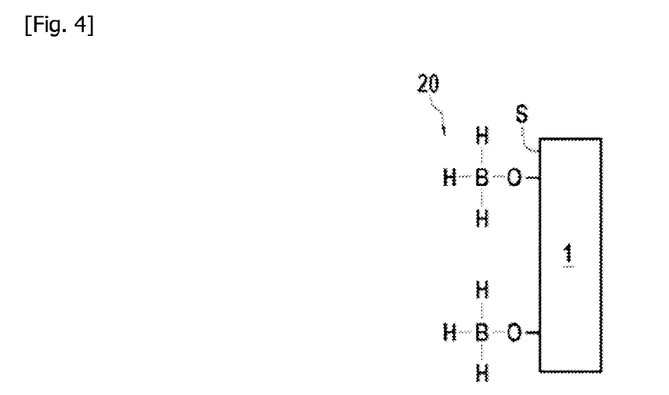
FIG. 4 schematically illustrates a step of the first exemplary method according to the invention.

After grafting, the grafted promoter 20 always has at least one dangling boron-hydrogen bond (B—H) intended to react with the ceramic precursor resin (see FIG. 4).

Figure 5:
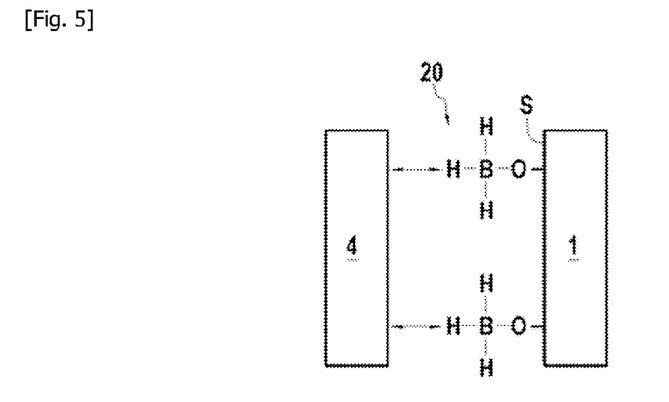
FIG. 5 schematically illustrates a step of the first exemplary method according to the invention.

Once the adhesion promoter 20 is grafted, a ceramic precursor resin 4 is introduced into the pores of the fibrous preform (see FIG. 5). The resin 4 introduced is in contact with the grafted promoter 20. The resin 4 can be introduced in the liquid state into the pores of the fibrous preform. The resin 4 can be injected into the pores of the fibrous preform. This resin 4 is known per se, and can be chosen from:

polysiloxane resins, polysilazane resins, polycarbosiloxane resins, polycarbosilane resins, polycarbosilazane resins and the mixtures of such resins.

Once the resin 4 is introduced, it will bond covalently to the grafted promoter 20.

This bond is produced by a chemical reaction between the B—H bond and a reactive function carried by the resin 4. By way of example, the reactive function of the resin can be an N—H group which can react with the B—H bond of the promoter by a dehydrocoupling reaction in order to form a B—N bond. This is, for example, the case when the resin is a polysilazane resin, such as that marketed by Merck under the reference "Durazane 1800". According to another example, it is possible to use a resin comprising a carbon-carbon double bond as reactive function, which is able to react with the B—H bond of the promoter by a hydroboration reaction followed by a dehydrocoupling in order to form a B—C bond. This is the case when, for example, the resin is a polycarbosilane resin, such as that marketed by Starfire® Systems under the reference "SMP-10". Whatever the embodiment considered, the chemical reaction between the introduced resin and the grafted adhesion promoter can comprise a dehydrocoupling reaction, optionally preceded by a hydroboration reaction.

The bonding of the resin 4 to the grafted promoter 20 is carried out by performing a second heating. The second heating enables, both polymerising of the resin 4 and activating of the reaction of its bond to the grafted promoter 20. From the general knowledge of a person skilled in the art, it is known to determine the value of the temperature to be imposed during the second heating depending on the resin and grafted promoter 20 used. A temperature between 90° C. and 250° C. can typically be imposed during the second heating.

Figure 6:
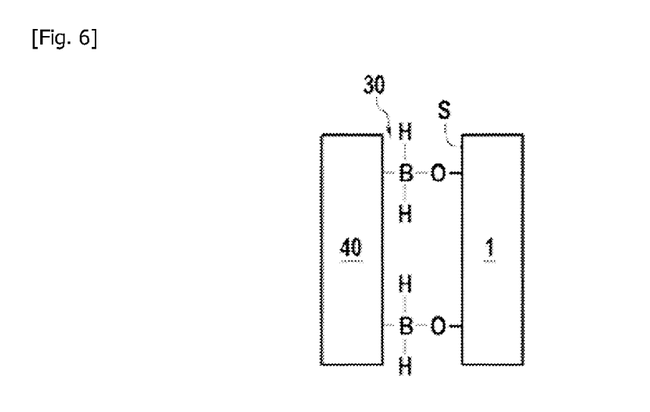
FIG. 6 schematically illustrates a step of the first exemplary method according to the invention.
Figure 7:
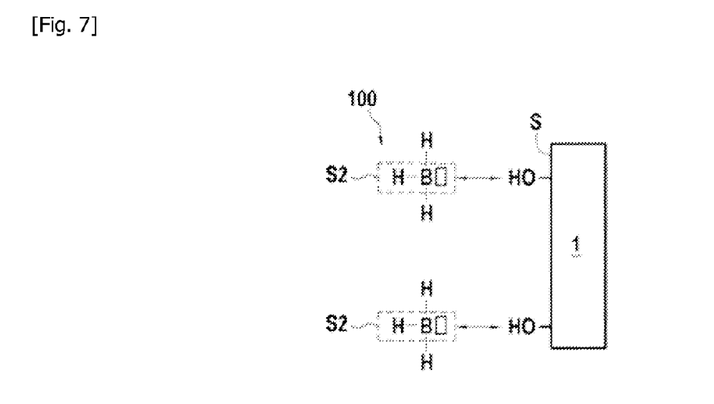
FIG. 7 schematically illustrates a step of a second exemplary method according to the invention.

FIG. 6 shows the bonding of the polymerised resin 40 to the grafted promoter 30. The grafted promoter 30 forms one arm of the bond between the polymerised resin 40 and the coating 1. The polymerised resin 40 is then pyrolysed in order to form a ceramic matrix phase in the pores of the fibrous preform.

It should be noted that the formation of the matrix of the part can involve the performance of a plurality of PIP cycles for introduction and pyrolysis of a ceramic precursor resin. In which case, an adhesion promoter can be grafted to a matrix block obtained by PIP before each new introduction of the ceramic precursor resin. In this case, the adhesion promoter bonds the various PIP matrix blocks, in order to improve the adhesion of these blocks to one another.

Figure 8:
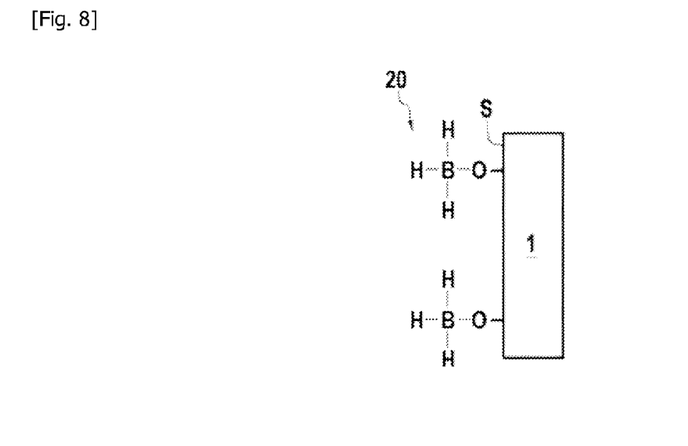
FIG. 8 schematically illustrates a step of the second exemplary method according to the invention.
Figure 9:
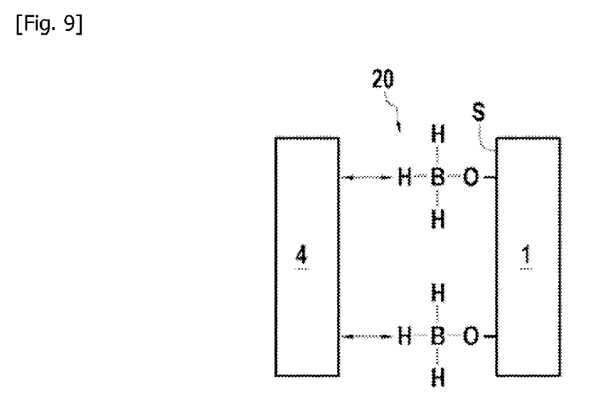
FIG. 9 schematically illustrates a step of the second exemplary method according to the invention.
Figure 10:
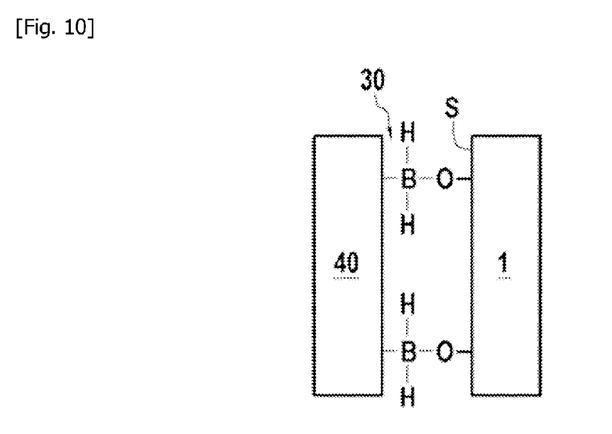
FIG. 10 schematically illustrates a step of the second exemplary method according to the invention.

FIGS. 7 to 10 are analogous to FIGS. 3 to 6 and relate to the case where the adhesion promoter 100 is a Lewis acid, here $BH_3$. The adhesion promoter 100 comprises a reactive structure S2 of formula B—H, with B having an empty orbital represented schematically by the empty rectangle in FIG. 7. The oxygen of the —OH groups is intended to fill this empty orbital, and the B—H portion is intended to react with the ceramic precursor resin. A promoter 20 is thus obtained, grafted to the surface of the coating 1 (FIG. 8). The interaction and the reaction of the grafted promoter 20 with the resin 4 illustrated in FIGS. 9 and 10 takes place in the same manner as previously described.

Once obtained, the part thus manufactured can be a part for aeronautical or aerospace application. The part may be a hot part of a gas turbine of an aeronautical or aerospace engine or of an industrial turbine. The part may be a turbomachine part. The part may constitute at least part of a distributor, at least part of a nozzle, or a thermal protection coating, a wall of a combustion chamber, an annular sector of a turbine or a turbomachine blade.

Example

During the impregnation method, the fibrous preform is held in a sealed mould under an inert atmosphere. The fibrous preform is made of SiC fibres (Hi-Nicalon S) coated with an SiC matrix obtained by CVI. Prior to the addition of the polymer, the fibrous preform is impregnated by a controlled quantity of borane dimethylsulfide (2M in toluene, Sigma Aldrich). The borane dimethylsulfide is held in contact with the coated fibres for 12 hours at 20° C., then the assembly is placed under dynamic vacuum in order to remove the solvent, i.e. toluene, which is condensed in a trap immersed in liquid nitrogen. After evaporation of the solvent, the mould is placed under static vacuum in order to impregnate the fibrous preform with the preceramic polymer (Durazane 1800). After impregnation with the polymer, the assembly is held under dynamic vacuum and is then placed under argon in order to be heat-treated up to 130° C. (solidification temperature of the polymer) before cooling in order to demould the fibrous preform impregnated with the polymer.

The expression "between . . . and . . . " should be understood to include the limits.

The invention claimed is:

1. A method for manufacturing a part made of composite material comprising:
   a) introducing an adhesion promoter into pores of a fibrous preform formed by yarns coated by a coating having —OH groups at its surface, the adhesion promoter being a Lewis complex or a Lewis acid, the Lewis complex adhesion promoter comprising a reactive structure Si of formula B1-X—H, where B1 is a Lewis base, the Lewis acid adhesion promoter comprising a reactive structure S2 of formula X—H with the atom X having an empty orbital, in these two alternatives, X designates boron or aluminium,
   b) grafting the adhesion promoter to the surface of the coating by addition on the —OH groups at the atom X,
   c) introducing a ceramic precursor resin into the pores of the fibrous preform, after the step of grafting the adhesion promoter,
   d) polymerising the introduced resin and bonding the grafted adhesion promoter to the resin by chemical reaction between these two compounds at the X—H bond of the grafted promoter, the polymerisation and the bonding being carried out by heating the fibrous preform into which the resin has been introduced,
   e) forming a ceramic matrix phase in the pores of the fibrous preform by pyrolysis of the polymerised resin.

2. The method according to claim 1, wherein X is boron.

3. The method according to claim 1, wherein the adhesion promoter is a Lewis complex of general formula B1-$BH_3$ or B1-$AlH_3$.

4. The method according to claim 1, wherein the adhesion promoter is a Lewis complex and wherein the Lewis base B1 is of formula *—S—$R_2$ or *—N—$R_3$, with *- designating the bond to the atom X and in each of these formulas the R groups being identical or different and being a saturated or unsaturated hydrocarbon chain containing 1 to 12 carbon atoms.

5. The method according to claim 1, wherein the adhesion promoter is a Lewis acid of general formula $R'_2$—BH or $R'_2$—AlH, in each of these formulas the R' groups being identical or different and being a hydrogen atom, a saturated or unsaturated hydrocarbon chain containing 1 to 12 carbon atoms, the R' groups optionally together defining a same cyclic hydrocarbon chain.

6. The method according to claim 1, wherein the ceramic precursor resin comprises at least one reactive function reacting with the X—H bond of the adhesion promoter grafted during step d) and chosen from: a carbon-carbon double bond, an N—H group, an Si—H group or an OH group.

7. The method according to claim 6, wherein the reactive function is an allyl group or a vinyl group.

8. The method according to claim 1, wherein the material forming the surface of the coating is chosen from: carbon, boron-doped carbon, silicon carbide, boron nitride, boron nitride doped with silicon or silicon nitride.

9. The method according to claim 1, wherein the resin is chosen from: polysiloxane resins, polysilazane resins, polycarbosiloxane resins, polycarbosilane resins, polycarbosilazane resins and the mixtures of such resins.

* * * * *